United States Patent Office 2,732,353
Patented Jan. 24, 1956

2,732,353

METHOD OF EXPANDING POLYMERIC COMPOSITIONS BY THE DECOMPOSITION OF p-CARBOMETHOXY BENZAZIDE

Mack F. Fuller, Woodbury, N. J., assignor to E. I. du Pont de Nemours and Company, Wilmington, Del., a corporation of Delaware No Drawing. Application October 31, 1952,
Serial No. 318,087

1 Claim. (Cl. 260—2.5)

The present invention relates to the art of preparing cellular compositions of elastomers, plastics, resins, and the like.

Heretofore, many such cellular compositions have been known to the art. However, in many instances, the properties of these compositions have proved to be undesirable due to characteristics of the blowing agents employed, and/or the decomposition products of the same. For instance, some of these have been toxic, and some have been characterized by undesirable odors. Others have displayed unsatisfactory color characteristics, and in other instances, a sufficiently small and uniform cell structure has been lacking in the final product. Furthermore, the processes involved in the manufacture of some of the agents have been characterized by poor yields and difficulty has been encountered in finding raw materials sufficiently available to permit satisfactory manufacturing processes.

The object of the present invention is the production of new and improved cellular compositions. A further object is a novel and desirable process for the manufacture of such cellular compositions. An additional object is the adaptation of new and improved blowing agents for carrying out these improved processes and manufacturing the products mentioned. Other objects will be appreciated from the following description of the invention.

According to the present invention the composition of elastomer, plastic, resin, or the like, is treated in an uncured or unfluxed state by intimately dispersing therein, p-carbomethoxy benzazide. The composition is then heated to produce a material having a cellular structure of substantially uniform pore size and having a volume several times that of the original composition. The invention may be more readily understood from the following examples.

Example 1

A rubber stock was prepared which had the composition indicated below:

| | Parts |
|---|---|
| Synethic rubber (type W neoprene) | 100 |
| Zinc oxide | 5 |
| Anti-oxidant 2246 [1] | 2 |
| Process oil | 15 |
| Petrolatum | 3 |
| Magnesium oxide | 4 |
| Accelerator NA 22 [2] | 0.5 |
| Total | 129.5 |

[1] 2,2 methylene bis (4-methyl, 6-tert-butyl phenol).
[2] 2-mercaptoimidazoline.

Seven parts of p-carbomethoxy benzazide was milled into this composition below 50° C. for about 15 minutes. The milled composition was cut to fill a circular mold 3" in inside diameter and ¼" deep. The mold was clamped between the platens of a hydraulic press under 3200 p. s. i. pressure and heated for 6 minutes with 60 p. s. i. steam in the platens of the press. The press was opened, and the expanded neoprene disc was allowed to pop from the mold. The expanded composition thus obtained was an odorless, very light cream-colored, exceedingly fine-celled sponge, having a volume six times that of the mold.

Example 2

A rubber stock was prepared which had the composition indicated below:

| | Parts |
|---|---|
| Pale crepe 85P | 100 |
| Zinc oxide | 5 |
| Stearic acid | 1 |
| Process oil | 10 |
| Whiting | 50 |
| Dixie clay | 37.5 |
| Sulfur | 3.5 |
| MBTS [1] | 1 |
| Total | 208.0 |

[1] Benzothiazyl disulfide.

Seven parts of p-carbomethoxy benzazide was milled into this composition below 40° C. for about 15 minutes. The milled composition was cut to fill a circular mold 3" in inside diameter and ¼" deep. The mold was clamped between the platens of a hydraulic press under 3200 p. s. i. pressure and heated for 13 minutes with 60 p. s. i. steam in the platens of the press. The press was opened, and the expanded rubber disc was allowed to pop from the mold. The expanded composition thus obtained was an odorless, very light cream-colored, exceedingly fine-celled sponge, having a volume 3.5 times that of the mold.

Example 3

A plastisol was prepared by stirring together the following ingredients at room temperature with a mortar and pestle:

| | Parts |
|---|---|
| "Geon" paste resin #121 | 100 |
| Flexol DOP (dioctyl phthalate) | 150 |
| Basic lead carbonate | 10 |
| p-Carbomethoxy benzazide | 20 |

The plastisol was poured into a circular mold 3" in inside diameter and ¼" deep. The mold was covered with an aluminum gasket, and clamped between the cold platens of a hydraulic press, 3200 p. s. i. pressure being applied to the 3½" ram of the press. Steam at 74 p. s. i. was applied to the platens for 20 minutes to flux the plastisol and decompose the blowing agent. The mold was cooled to room temperature, and the partially expanded cellular product was heated in an oven at 100° C. for one-half hour. The final product was a white, very fine-celled sponge, having a mild odor and a volume 5.5 times that of the mold.

p-Carbomethoxy benzazide may be employed for blowing both closed- and open-celled expanded rubber, natural and synthetic.

One to 15 parts of the blowing agent may be used per 100 parts of rubber polymer. In plastics and resins or in mixtures of rubber polymers with plastics or resins, the amount of blowing agent may vary from 2 to 50 parts per 100 parts of the plastic, resin, or polymer blend.

The temperatures for expanding and curing the compositions are usually in the range of 287° to 350° F., but the invention is not restricted to this range.

The use of p-carbomethoxy benzazide for blowing elastomers, resins, or plastics affords certain advantages over other known blowing agents. For example, it imparts no odor to the composition being blown; it does not affect the cure rate of elastomer compositions; it does not cause discoloration of the composition being blown or staining of paper, cloth, or enamel or lacquer finishes; and it may be used to form compositions having exceedingly fine cell structures.

It is intended that the invention shall be limited only by the following patent claims:

I claim:

A method for the preparation of expanded cellular products which includes the essential steps of intimately mixing p-carbomethoxy benzazide with a portion of an organic polymer composition, heating the resultant mixture to a temperature within the range of from about 200° F. to about 400° F. for a period of time sufficient to decompose the p-carbomethoxy benzazide and release a gas thereby foaming and expanding the organic polymer, said heating period being of sufficiently long duration to accomplish setting of the resultant foam.

References Cited in the file of this patent

UNITED STATES PATENTS 2,529,512 Ott _____ Nov. 14, 1950
2,661,355 Fuller and Van Fossen ____ Dec. 1, 1953

OTHER REFERENCES

J. Praht Chem., Davidis, 1896, vol. 54, Series 2, page 81.

Unicel ND, Bake, May, 1947, DuPont Report No. 47-3.